May 6, 1941.  W. L. CLOUSE  2,241,241
AIR COOLED CLUTCH
Filed Nov. 18, 1938  3 Sheets-Sheet 3

INVENTOR.
William L. Clouse, Deceased.
By The Commercial National Bank, Executor.
BY Richey & Watts
ATTORNEYS Patented May 6, 1941

2,241,241

UNITED STATES PATENT OFFICE 2,241,241

AIR COOLED CLUTCH

William L. Clouse, deceased, late of Tiffin, Ohio, by the Commercial National Bank, executor, Tiffin, Ohio, assignor to The National Machinery Company, Tiffin, Ohio, a corporation of Ohio Application November 18, 1938, Serial No. 241,224

13 Claims. (Cl. 192—113)

This invention relates to clutches and more particularly to an improved construction of fluid actuated heavy duty friction clutch.

Many difficulties have been encountered in attempting to use friction clutches to couple the driving and driven elements of heavy duty intermittently operated machinery such as forging machines, forging presses, shears and the like, these difficulties being due largely to the heat developed when the machine is operated steadily with repeated engagements of the clutch. In heavy duty machinery of this type it is customary to use a flywheel which is continuously rotated by a motor and to couple the flywheel to the driven member of the machine during the desired cycle of operation, at the conclusion of which the clutch is released and the machine brought to rest preparatory for the next operation. In machinery having parts of considerable inertia which must be started from rest and brought up to speed, considerable heat is developed in a friction clutch during the interval after the clutch is engaged and before the driven parts have been brought up to speed, while the friction surfaces are slipping relative to each other. This heat not only has a detrimental effect directly upon the friction linings or other friction surfaces employed in the clutch, but also when the clutch is attempted to be combined with the flywheel causes a thinning of the lubricant used in the flywheel bearings so that the lubricant is permitted to escape from the bearings and work into the friction surfaces, destroying or greatly impairing the effectiveness of the clutch.

Efforts to avoid this difficulty by leaving the friction members unenclosed so that air may pass between the friction surfaces when the clutch is disengaged have been unsuccessful because the air in shops and other locations in which machines of this character are used is commonly charged with dust, grit, smoke, oil and particles of scale, all of which lodge upon the friction surfaces of the clutch and either cut or lubricate these surfaces so that the effectiveness of the clutch is rapidly destroyed.

The principal object of this invention is to solve these problems by providing a friction clutch construction for heavy duty machinery in which the bearings and the friction members are effectively cooled without permitting a deposit of foreign matter on the friction surfaces themselves.

A further object of the present invention is to provide a combined flywheel and fluid actuated friction clutch construction in which the flywheel is supported upon anti-friction bearings and the actuating mechanism and friction plates are accessible for removal without disturbing the supporting bearings for the flywheel. Other objects and advantages of this invention will appear in the following detailed description of the preferred embodiment.

Figure 1:
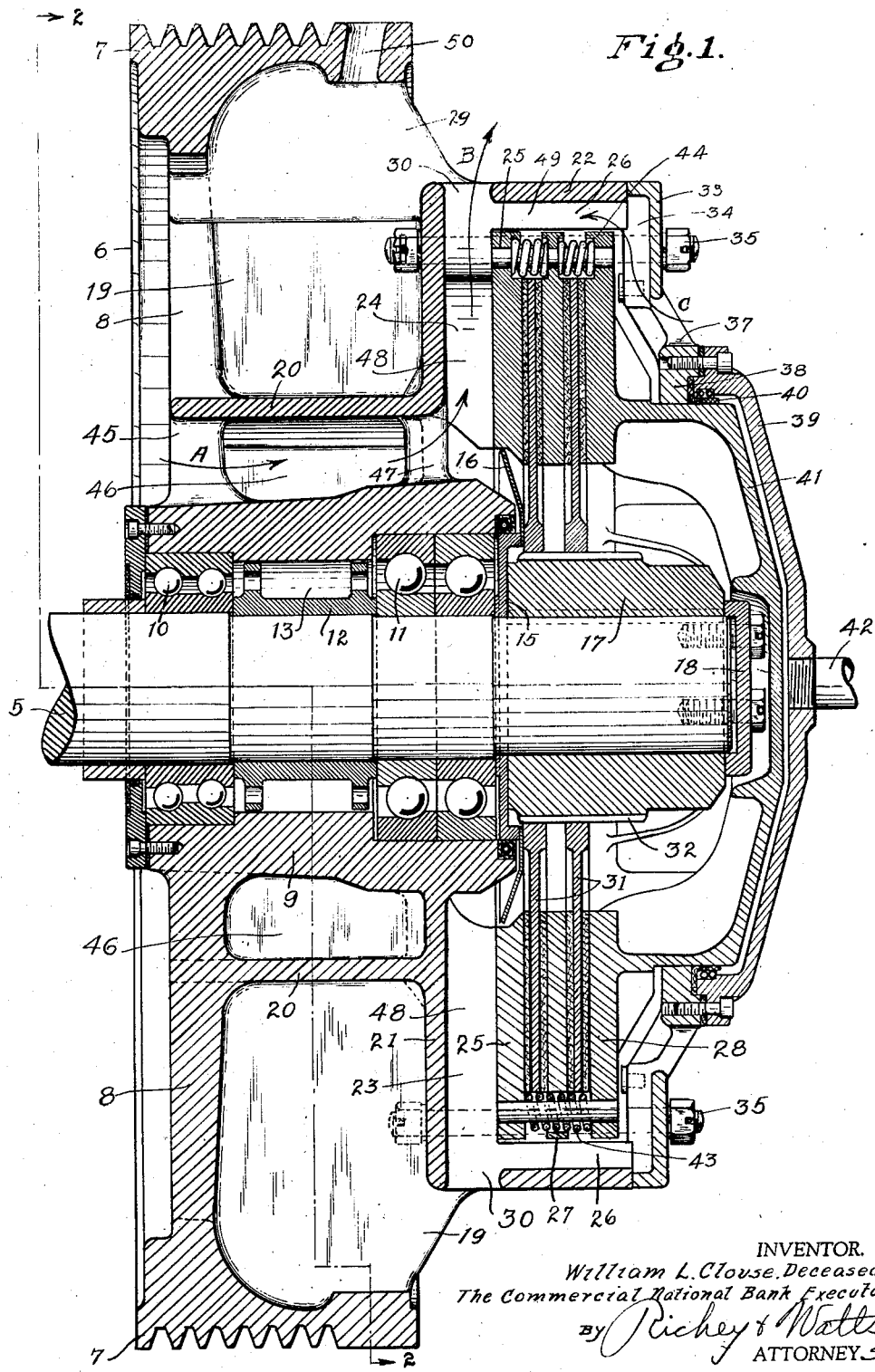
Figure 1 is a vertical section through a combined flywheel and clutch, embodying the present invention, taken on the lines 1—1 of Figures 2 and 3.

Referring to the drawings, the invention is illustrated in a form particularly adapted to be mounted upon the driven shaft 5 of a forging machine, press or the like. It will be understood by those skilled in the art that the shaft 5 projects laterally from the bed frame or other suitable supporting structure in the machine and is connected in any desired way with the operating parts of the machine. Rotatably mounted upon the shaft 5 is a flywheel 6 which, in the embodiment shown, consists of a relatively heavy rim 7 supported by a plurality of spokes 8 from a hub member 9 which bears upon the shaft through two sets of axially spaced ball bearings 10 and 11. In the embodiment shown the rim is formed to receive a belt to drive the wheel, but it will be understood that the rim might also be formed as a gear to receive the driving force. A spacer 12 is arranged on the shaft between the two sets of bearings 10 and 11 and is provided with a groove 13 opening to both sets of ball bearings which is adapted to receive and hold a quantity of grease to lubricate the bearings. The shaft 5 projects past the roller bearings 11 and carries a bearing retainer 15, a baffle plate 16, a sleeve 17 keyed to the shaft, and a retaining cap 18 bolted to the end of the shaft.

The spokes 8 extend radially between the hub 9 and the rim 7 at the rear side of the wheel and merge into relatively thin webs 19 extending axially substantially the full axial length of the hub and rim, thereby dividing the space between the hub 9 and the rim 7 into a plurality of separate compartments. Arcuate webs 20 concentric with and spaced radially from the hub 9 are integrally formed between each two adjacent spokes 8. At their forward edges the webs 20 are integral with a thrust wall 21 extending radially outward from the hub 9 and terminating at the rear edge of a substantially cylindrical flange 22.

The forward face of the wall 21 is provided with spaced radially extending alternately disposed ribs 23 and 24 against which a clutch plate 25 is seated. The inner surface of the cylindrical flange 22 is likewise provided with spaced ribs 26 extending radially inward a short distance and aligned with the ribs 23 and 24, the radially inward sides of the ribs 26 defining a cylindrical space within which the clutch plates are located. The clutch plate 25, a central clutch plate 27 and an outer pressure plate 28 are arranged to fit within the cylindrical space defined by the ribs 26, the rear plate 25 bearing against the ribs 23 and 24 as previously explained.

A plurality of relatively short radially extending webs 29 are integrally formed on the inner surface of the rim 7 of the flywheel between each two adjacent spokes and are integrally joined with the rear surface of the radially extending wall 21 and with the cylindrical flange 22. As shown, each of the ribs 23 and 24 on the forward face of the wall 21 is aligned axially with one of the webs 19 or 29. A series of holes 30 open radially outward through the flange 22 adjacent the wall 21, one hole 30 being located between each two adjacent ribs 23 and 24.

A pair of clutch discs 31 are slidably mounted upon the sleeve 17 keyed to the shaft and are held against rotation with respect to the sleeve 17 by splines or the like 32. Suitable friction material is secured to both faces of the plate 27 and to the adjacent faces of the plates 25 and 28, the clutch discs 31 being arranged between the adjacent friction lined surfaces of the plates 25, 27 and 28. A ring 33 is arranged to close the radially outer portion of the cylindrical space defined by the ribs 26 within which the friction members are positioned and is provided with ribs 34 arranged to abut the ends of ribs 26 so as to maintain the ring 33 spaced from the outer pressure plate 28.

The clutch plates 25, 27 and 28 are secured to the clutch housing formed by the wall 21, cylindrical flange 22 and ring 33 in any suitable way so as to be held against rotation with respect to the housing, but axially slidable therein. As shown, a plurality of bolts 35 extend through the ribs 24 and through the ring 33, these bolts being spaced radially inward from the ribs 26 and carrying squared spacer blocks 36 fitting within aligned recesses in the plates 25, 27 and 28. The bolts thereby secure the ring 33 to the flywheel structure and lock the clutch plates against rotation with respect thereto, while permitting axial sliding of the plates. The ring 33 preferably interfits with the flange 22 so that the ring is locked against rotation.

The ring 33 is formed with a plurality of short spokes 37 extending radially inward therefrom and integrally joined to an annulus 38. A cover plate or cylinder head 39 is bolted to the annulus 38, suitable packing 40 being interposed between these members. A piston 41 is integrally formed with the pressure plate 28 and slidably fits within the annulus 38 and the packing 40. A suitable connection 42 is provided to admit pressure fluid to the space between the cylinder head 39 and the piston 41 to force the piston and its integral pressure plate 28 axially away from the cylinder head 39 and thereby clamp the clutch discs 31 between the three clutch plates 25, 27 and 28. Suitable springs such as those shown at 43 and 44 are preferably provided between the clutch plates 25, 27 and 28 to insure the uniform separation of these plates upon release of the pressure fluid. The springs 43 extend through holes in the central plate 27 and bear against the plates 25 and 28 and are arranged to be stressed when the clutch is fully released, so as to hold the piston 41 against rattling and insure complete exhaust of the pressure fluid in the cylinder 39. The springs 44 are aligned in pairs, one between the plate 25 and the plate 27, and the other between the plate 27 and the plate 28. These springs are arranged to insure a quick positive separation of all of the friction surfaces when the fluid pressure is exhausted, although because of their short length are substantially unstressed at full release.

Figure 2:
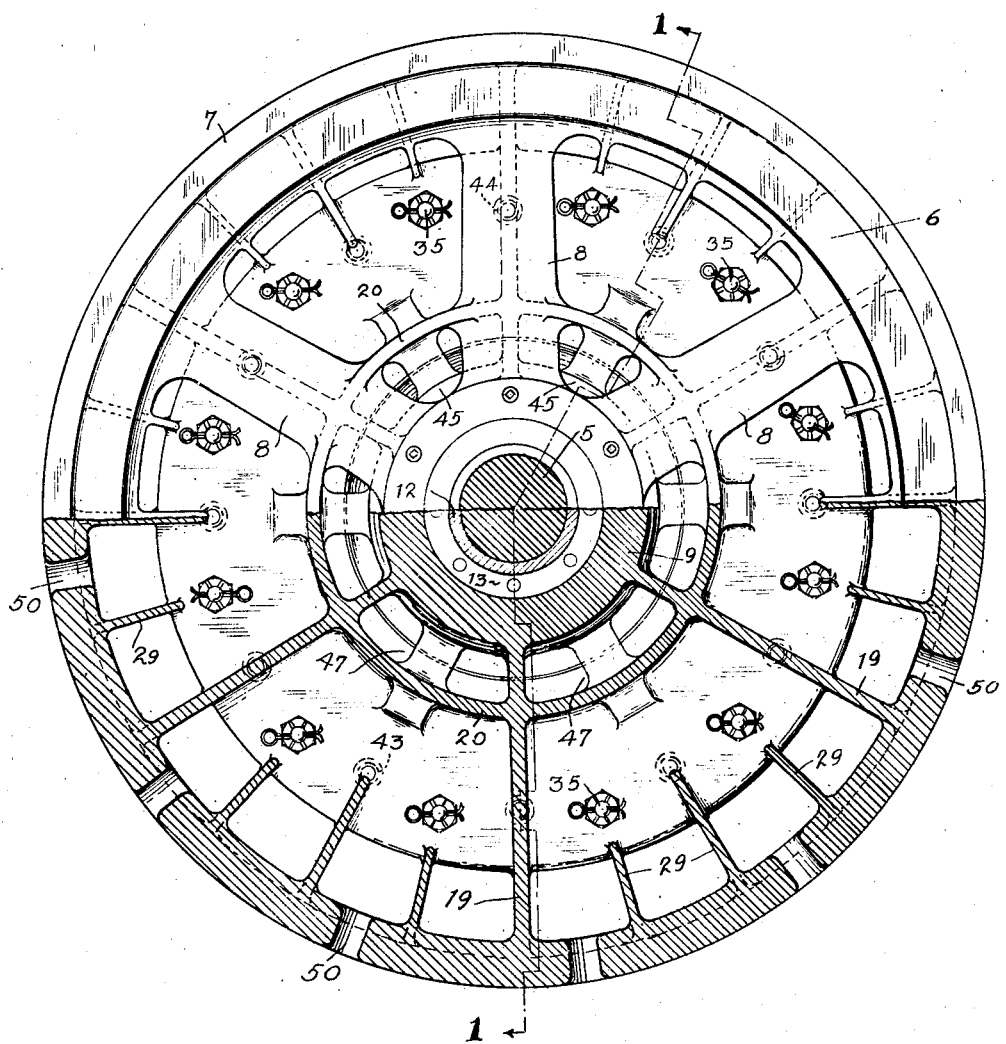
Figure 2 is a rear elevation and section of the structure shown in Figure 1, taken on the line 2—2 of Figure 1.
Figure 3:
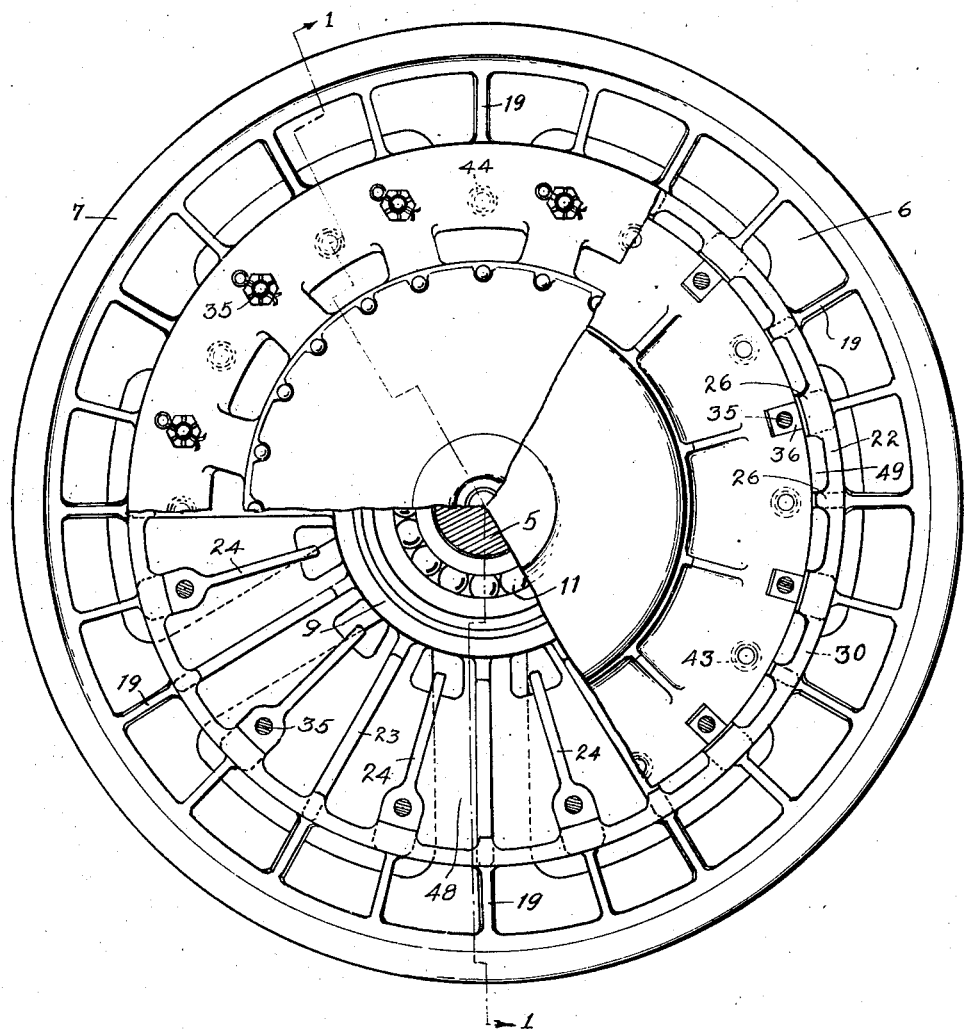
Figure 3 is a front elevation of the structure shown in Figure 1, the outer cylinder cover plate being broken away to expose the piston and pressure plate, and the piston, pressure plate and friction plates in turn being broken away to expose the flywheel casting.

The spokes 8 as shown in Figures 1 and 2 extend between the hub 9 and the arcuate webs 20 and the spaces 45 between the inner portions of the spokes 8 provide openings from the rear side of the flywheel into the series of sector shaped spaces 46 between the hub 9 and the arcuate webs 20. Openings 47 are formed in the radial wall 21 between each pair of radial ribs 23, and between the hub 9 and the arcuate webs 20, so as to provide communication between the spaces 46 and the radially extending spaces 48 between the ribs 23 and 24 on the front face of the wall 21.

In operation the flywheel 6 is ordinarily continuously rotated by a motor in any convenient manner, the shaft 5 being normally stationary and the flywheel rotating upon the spaced bearings 10 and 11. All of the parts illustrated except the shaft 5, the sleeve 17 and the two clutch discs 31 splined to the sleeve 17 rotate with the flywheel. When pressure fluid is admitted through the pipe 42 to the space between the cylinder head 39 and the piston 41, the piston 41 and the pressure plate 28 are forced axially inward, gripping the clutch discs 31 between the friction surfaces on plates 25, 27 and 28, and thereby causing the shaft 5 to rotate with the flywheel. In the normal operation of intermittently operated machinery the clutch remains engaged for one cycle and is then disengaged, the machine and shaft 5 being stopped by a suitable brake or the like, the flywheel and associated parts continuing to rotate. This operation is repeated for each desired cycle or operation of the machine, and in heavy machinery considerable heat is developed by the interengaging clutch discs and clutch plates during the period of slippage while the clutch is engaging.

The radial spaces 48 between the ribs 23 and 24 and between the forward face of the wall 21 and the rear face of the clutch plate 25 serve as centrifugal blowers so that when the flywheel is rotating, air is drawn through the apertures 45 into the spaces 46 as indicated by the arrows A, then through the openings 47 and outwardly to atmosphere through the spaces 48 and the openings 30 as indicated by the arrows B. At the same time air is entrained in the spaces 49 between the ribs 26 on the inner surface of the cylindrical flange 22 and is drawn inwardly from the front face of the flywheel through the spaces between the spokes 37 and rearwardly through the spaces 49, as indicated by the arrows C, so that it passes out to atmosphere through the openings 30.

The main body of the flywheel, behind the clutch, is likewise open to atmosphere between the spokes 8 and webs 19 on the rearward side and between the webs 19 and 29 radially outward from the flange 22 on the forward side. Holes 50 are likewise formed through the rim 7 so that air is caused to flow between the webs 19 and 29 and outwardly through the holes 50 and the spaces between the webs on the forward side of the flywheel.

The baffle plate 16 prevents air entering the spaces 46 from passing between the friction surfaces on the clutch discs and plates so that this air is compelled to move radially outward through the spaces 48, and between the wall 21 and the clutch plate 25. Air entering between the spokes 37 on the front face of the clutch assembly is prevented from reaching the spaces between the clutch plates and discs by the solid wall of the piston 41 which is integrally joined with the pressure plate 28, so that the air entering these openings must move radially outward between the ribs 34 and thence rearwardly through the spaces 49 to the openings 30.

By reason of this construction a substantial quantity of air is caused to flow through the spaces 46, thereby moving directly over the full length of the hub 9 and preventing any excessive heating of the bearings or the grease contained in the space 13. At the same time a large quantity of air is pumped through the spaces 48 and therefore directly along the rear face of the clutch plate 25 so as to effectively absorb heat from this clutch plate. Likewise a substantial quantity of air moves through the spaces between the spokes 37 and along the forward face of the pressure plate 28 and thence past the edges of the clutch plates 25, 27 and 28, greatly assisting in dissipating the heat from the clutch plates and thereby preventing deterioration of the friction surfaces on the clutch plates from heat.

The assembly of the clutch parts and flywheel as described not only permits the utilization of the flywheel as a blower to prevent overheating of the clutch plates and bearings, but also facilitates assembly and dismantling of the clutch parts for repair and adjustment. The center of gravity of the entire flywheel and clutch assembly falls between the two spaced bearings 10 and 11 so that the cylinder head 39, the ring 33, the piston 41 and pressure plate 28 and the remaining clutch plates and discs may all be removed from the end of the assembly without disturbing the balance of the parts or the adjustment of the bearings 10 and 11. This results in a great economy of time and expense in maintenance and service of the clutch, since where the outer bearing of the flywheel is located outside of the piston or the clutch plates it is necessary to first support the flywheel by means of a crane or in some other manner before removing the outer bearing to obtain access to the clutch plates. It is apparent that supporting the flywheel by means of a crane or other external support so that it remains in precisely the same position when the outer bearings are removed is an extremely delicate operation and it has been found in many cases in clutches of this type that the flywheel slips and crushes the inner bearings before the parts have been reassembled. Likewise the driving force applied to the rim of the wheel is located between the two sets of bearings so that the wheel operates smoothly at all times. The clutch is beyond the bearings of the wheel on the shaft, but this is immaterial since the clutch merely applies a uniform turning moment to the shaft and the unbalanced driving force is distributed between the bearings.

In the embodiment illustrated, the greater portion of the mass of the flywheel rim is located adjacent the rear edge, and likewise the main supporting spokes 8 are located at the rear side of the wheel, thereby assisting in locating the center of gravity of the entire structure between the spaced bearings 10 and 11.

While the preferred embodiment of the invention has been described in detail, it will be understood that many variations and modifications may be resorted to without departing from the scope of the invention as defined in the following claims.

What is claimed is:

1. A clutch comprising a shaft and a housing rotatably mounted thereon, interengaging friction clutch members carried by said housing and said shaft respectively, a piston attached to the outer of said interengaging members and encompassing the end of said shaft, a cylinder receiving said piston carried by said housing, and said housing having openings in one surface surrounding said cylinder and spaced radially inward from the outer periphery of said housing, and air passages formed in said housing communicating with said openings and extending past the outer edges of said interengaging members and opening to atmosphere adjacent the outer periphery of said housing 2. A clutch comprising a shaft and a housing rotatably mounted thereon, interengaging friction clutch members carried by said housing and said shaft respectively, a piston attached to the outer of said interengaging members and encompassing the end of said shaft, a cylinder receiving said piston carried by said housing, and said housing having openings in one surface surrounding said cylinder and spaced radially inward from the outer periphery of said housing, and air passages formed in said housing communicating with said openings and extending past the outer edges of said interengaging members and opening to atmosphere adjacent the outer periphery of said housing, said piston closing said air passages from the inner edges of staid interengaging members.

3. In combination with a shaft, a wheel rotatably mounted on said shaft on axially spaced bearings, interengaging friction clutch discs carried by said wheel and said shaft, said wheel having an axially extending hub engaging said spaced bearings and webs spaced outwardly from said hub forming axially extending air passages radially outward from said hub extending past both of said bearings and the space therebetween, said air passages at one end communicating with the atmosphere, and said wheel having a radially disposed wall joined to said webs at the other end thereof and extending radially outward parallel to and spaced from said interengaging discs, said wall having ribs engaging the adjacent one of said discs forming separated air passages between said wall and said discs communicating with the passages between said hub and said webs and opening to atmosphere radially outward of said discs.

4. In combination with a shaft, a wheel rotatably mounted on said shaft on axially spaced bearings, interengaging friction clutch members carried by said wheel and said shaft, said wheel having an axially extending hub engaging said spaced bearings and webs spaced outwardly from said hub forming axially extending air passages radially outward from said hub extending past both of said bearings and the space therebetween, said air passages at one end communicating with the atmosphere, and said wheel having a wall joined to said webs at the other end thereof and extending radially outward and spaced from said interengaging members, forming air passages between said wall and said members communicating with the passages between said hub and said webs and opening to atmosphere radially outward of said webs, and means closing said air passages from the inner edges of said interengaging members.

5. In combination with a shaft, a flywheel comprising a hub, spokes, and a flywheel rim, said wheel being rotatably mounted on the shaft, spaced sets of anti-friction bearings between the shaft and the hub located adjacent the opposite ends of the hub, a thrust wall connected to the outer sides of the spokes and extending radially adjacent the outer set of anti-friction bearings, a flange extending outwardly from the thrust wall beyond the outer set of bearings, friction clutch plates keyed to said shaft beyond the outer end of said hub, co-operating friction clutch plates keyed to said flange, a piston engaging the outer of said clutch plates, a cylinder receiving said piston carried by said flange, said piston being arranged to press said clutch plates against said thrust wall, the flywheel and clutch assembly being supported only by said two sets of bearings and the parts being so proportioned that the center of mass of the entire flywheel and clutch assembly is located between said two sets of bearings.

6. In combination with a shaft, a flywheel comprising a hub, spokes, and a flywheel rim, said flywheel being rotatably mounted on the shaft, said rim being arranged to be driven to rotate said flywheel, spaced sets of anti-friction bearings between the shaft and the hub located adjacent the opposite ends of the hub, a thrust wall connected to the outer sides of the spokes and extending radially adjacent the outer set of anti-friction bearings, a flange extending outwardly from the thrust wall beyond the outer set of bearings, friction clutch plates keyed to said shaft beyond the outer end of said hub, co-operating friction clutch plates keyed to said flange, a piston engaging the outer of said clutch plates, a cylinder receiving said piston carried by said flange, said piston being arranged to press the clutch plates against said thrust wall, the flywheel and clutch assembly being supported solely by said two sets of bearings and the parts being so proportioned that the center of mass of the entire flywheel and clutch assembly is located between said two sets of bearings, and the driving force applied to said rim is likewise located between said two sets of bearings.

7. In combination, a shaft, a wheel having a hub rotatably mounted on said shaft, interengaging friction clutch discs carried by said wheel and said shaft, means for exerting an axial pressure on said clutch discs to couple the wheel and shaft, a thrust member carried by said wheel and arranged to receive the axial thrust of said means, said wheel and member being formed with air passages open to atmosphere adjacent one end of said hub and extending axially along said hub and radially between said thrust member and said discs and opening to atmosphere adjacent the periphery of said clutch discs, said passages being closed from the inner edges of said clutch discs.

8. In combination, a shaft, a wheel rotatably mounted on said shaft, a radially disposed thrust wall carried by said wheel, interengaging friction clutch discs keyed to said wheel and said shaft including a disc keyed to said wheel adjacent said thrust wall, a plurality of radially disposed ribs between said thrust wall and the adjacent disc, the spaces between said ribs being open to atmosphere adjacent their inner and outer ends, said spaces being closed from the inner edges of said clutch disc.

9. In combination with a shaft, a wheel, interengaging friction clutch discs carried by said wheel and said shaft, means for exerting axial pressure on said clutch discs to couple the wheel and shaft, said wheel including a housing member extending across the outer edges of said clutch discs and radially inward along one side thereof, said housing member being formed with air passages having inlet openings to atmosphere in the radially inwardly extending portion thereof, said air passages extending outwardly and then axially between separating ribs past the outer edges of said clutch discs and having outlet openings to atmosphere radially outward of the edges of said clutch discs.

10. In combination with a driven shaft, a wheel rotatably mounted on said shaft on axially spaced bearings, interengaging friction clutch members carried by said wheel and said shaft, said wheel having a hub portion formed with axially extending air passages extending past both of said bearings and the space therebetween and open to atmosphere at one end, said wheel being formed with radially extending air passages communicating with the other ends of said axially extending passages and open to atmosphere radially outward from said hub, all of said passages being closed from the engaging surfaces of said friction clutch members.

11. A flywheel adapted to be rotatably mounted on a shaft comprising a hub, spokes and a rim, friction clutch means carried by said flywheel adapted to be engaged with friction clutch means carried on the shaft, webs carried by said wheel spaced outwardly from said hub and forming axially extending air passages between said webs and said hub, said wheel being formed with circumferentially separated spaces extending therethrough between said webs and said rim and having inlet openings to atmosphere on one side of the wheel and outlet openings to atmosphere on the other side of the wheel spaced radially outward from said inlet openings, said air passages between said webs and said hub opening to atmosphere at one end and communicating with radially extending air passages formed in said wheel opening to atmosphere adjacent the outlet openings of said spaces.

12. In combination with a shaft, a flywheel comprising a hub, spokes and a rim, interengaging friction clutch discs carried by said wheel and said shaft, means for exerting axial pressure on said clutch discs to couple the wheel and shaft, said wheel being formed with circumferentially separated spaces extending therethrough between said hub and said rim and having inlet openings to atmosphere on one side of the wheel and outlet openings to atmosphere on the other side of the wheel spaced radially outward from said inlet openings, said wheel including a housing member extending across the radially outer edges of said clutch disc and extending radially inward along one side thereof, said housing member being formed with air passages opening to atmosphere in the radially inwardly extending portion thereof, said air passages extending outwardly and then axially past the outer edges of said clutch discs and having outlet openings to atmosphere radially outward of the edges of said clutch discs merging into the outlet openings of said spaces.

13. In combination with a shaft, a flywheel including a hub, spokes and a rim, said hub being rotatably mounted on said shaft, interengaging friction clutch members carried by said wheel and said shaft, said wheel having webs spaced outwardly from said hub forming axially extending air passages between said hub and said webs opening to atmosphere at one end, said wheel having a wall joined to said webs at the other end thereof and extending radially outward adjacent said interengaging members and forming radially extending air passages communicating with said axially extending air passages and extending outwardly past said interengaging members, said wheel being formed with circumferentially separated spaces extending therethrough between said webs and said rim, said spaces having inlet openings to atmosphere on one side of said wheel and outlet openings to atmosphere on the other side of said wheel spaced radially outward from said inlet openings and said radially extending air passages merging into said outlet openings.

THE COMMERCIAL NATIONAL BANK,
*Executor of the Last Will and Testament of William L. Clouse, Deceased,*
By R. D. SNEATH,
        *President.*